US011105275B2

(12) United States Patent
Zeumer et al.

(10) Patent No.: US 11,105,275 B2
(45) Date of Patent: Aug. 31, 2021

(54) REGULATING FLAP

(71) Applicant: EBERSPÄCHER EXHAUST TECHNOLOGY GMBH & CO. KG, Neunkirchen (DE)

(72) Inventors: Annika Zeumer, Wernau (DE); Steffen Schmitt, Ostfildern (DE); Alexander Lermer, St. Georgen (DE); Domenic Binder, Niedereschach (DE); Thomas Faller, Hardt (DE); Andreas Kaiser, Schonach im Schwarzwald (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 0 days.

(21) Appl. No.: 16/495,174

(22) PCT Filed: Nov. 23, 2018

(86) PCT No.: PCT/EP2018/082410
§ 371 (c)(1),
(2) Date: Sep. 18, 2019

(87) PCT Pub. No.: WO2019/101945
PCT Pub. Date: May 31, 2019

(65) Prior Publication Data
US 2021/0079854 A1 Mar. 18, 2021

(30) Foreign Application Priority Data

Nov. 23, 2017 (DE) .......................... 102017127740.4

(51) Int. Cl.
*F02D 9/10* (2006.01)
*F02D 9/04* (2006.01)
(Continued)

(52) U.S. Cl.
CPC .............. *F02D 9/107* (2013.01); *F02D 9/04* (2013.01); *F16K 27/0218* (2013.01);
(Continued)

(58) Field of Classification Search
CPC ..... F02D 9/04; F02D 9/06; F02D 9/08; F02D 9/10; F02D 9/1035; F02D 9/1065;
(Continued)

(56) References Cited

U.S. PATENT DOCUMENTS 4,509,719 A * 4/1985 Uomala .................. F16K 27/12
137/315.28
4,928,924 A * 5/1990 Kivipelto ................ F16K 27/12
251/315.12

(Continued)

FOREIGN PATENT DOCUMENTS

CN 101978201 A 2/2011
CN 102803754 A 11/2012
(Continued)

*Primary Examiner* — John M Zaleskas
(74) *Attorney, Agent, or Firm* — McGlew and Tuttle, P.C.

(57) ABSTRACT

A regulating flap, especially exhaust flap for the exhaust gas stream of an internal combustion engine, includes a flap body (12), a flap diaphragm (16) carried on a pivot shaft (14) that is rotatable about a pivot axis (S) in the interior of the flap body (12). A pivot drive (20) has a drive element (30) to be coupled with the pivot shaft (14). A fixing device (40) fixes the pivot drive (20) in relation to the flap body (12). The fixing device (40) includes a bayonet fastener (38).

5 Claims, 4 Drawing Sheets

(51) Int. Cl.
  *F16K 27/02* (2006.01)
  *F16K 31/05* (2006.01)
  *F16K 31/04* (2006.01)
  *F02M 26/52* (2016.01)
  *F02D 9/06* (2006.01)

(52) U.S. Cl.
  CPC .......... *F16K 31/043* (2013.01); *F16K 31/055* (2013.01); *F02D 9/06* (2013.01); *F02M 26/52* (2016.02)

(58) Field of Classification Search
  CPC ......... F02D 9/107; F02M 26/70; F16B 21/04; F16K 1/221; F16K 31/043
  See application file for complete search history.

(56) References Cited

U.S. PATENT DOCUMENTS

| | | | | |
|---|---|---|---|---|
| 5,102,096 | A * | 4/1992 | Siegel | B60T 8/3675 251/129.15 |
| 5,531,205 | A * | 7/1996 | Cook | F02D 9/101 123/568.24 |
| 5,597,260 | A * | 1/1997 | Peterson | F16B 21/04 403/316 |
| 6,032,920 | A * | 3/2000 | Takahashi | F02D 9/06 251/58 |
| 6,113,063 | A * | 9/2000 | Takahashi | F02D 9/06 251/58 |
| 6,598,619 | B2 | 7/2003 | Gagnon | |
| 9,964,220 | B1 * | 5/2018 | Ro | F16K 31/0675 |
| 2003/0056836 | A1 * | 3/2003 | Gagnon | F02M 26/54 137/554 |
| 2004/0099833 | A1 * | 5/2004 | Haikawa | F16K 31/041 251/292 |
| 2005/0092293 | A1 * | 5/2005 | Arai | F02D 9/107 123/399 |
| 2006/0237679 | A1 * | 10/2006 | Tanghetti | F16K 31/607 251/286 |
| 2008/0115494 | A1 * | 5/2008 | Willats | F16K 31/041 60/686 |
| 2012/0199776 | A1 * | 8/2012 | Kreuter | F16K 31/045 251/292 |
| 2013/0043416 | A1 * | 2/2013 | Endt | F16K 31/055 251/129.11 |
| 2013/0270470 | A1 * | 10/2013 | Bonanno | F16K 31/041 251/129.11 |
| 2015/0075161 | A1 * | 3/2015 | Kaufmann | F16K 31/041 60/605.1 |
| 2018/0128381 | A1 * | 5/2018 | Schmitt | F16K 31/041 |
| 2018/0238209 | A1 * | 8/2018 | Suzuki | F02D 9/08 |
| 2018/0372239 | A1 * | 12/2018 | Becker | F15B 15/2884 |
| 2020/0095945 | A1 * | 3/2020 | Zeumer | F16K 1/221 |
| 2020/0095946 | A1 * | 3/2020 | Zeumer | F16K 31/043 |
| 2020/0256477 | A1 * | 8/2020 | Schmitt | F02D 9/04 |

FOREIGN PATENT DOCUMENTS

| | | | |
|---|---|---|---|
| CN | 204060943 U | 12/2014 | |
| DE | 33 10 813 A1 | 10/1983 | |
| DE | 86 24 525 U1 | 7/1987 | |
| DE | 40 13 875 A1 | 10/1991 | |
| DE | 44 01 559 C1 | 5/1995 | |
| DE | 4401559 C1 * | 5/1995 | ............ F16K 11/165 |
| DE | 696 11 604 T2 | 6/2001 | |
| DE | 103 30 225 A1 | 1/2005 | |
| DE | 10 2011 078 461 A1 | 1/2013 | |
| DE | 10 2011 110 384 A1 | 2/2013 | |
| DE | 10 2014 017 523 A1 | 6/2015 | |
| EP | 0 313 259 A2 | 12/1988 | |
| EP | 1561979 A1 * | 8/2005 | ............... F16K 1/22 |
| WO | WO-2009141189 A1 * | 11/2009 | ............... F02D 11/10 |

* cited by examiner

REGULATING FLAP

CROSS REFERENCE TO RELATED APPLICATIONS

This application is a United States National Phase Application of International Application PCT/EP2018/082410, filed Nov. 23, 2018, and claims the benefit of priority under 35 U.S.C. § 119 of German Application 10 2017 127 740.4, filed Nov. 23, 2017, the entire contents of which are incorporated herein by reference.

TECHNICAL FIELD

The present invention pertains to a regulating flap, which can be used, for example, as an exhaust flap in an exhaust system of an internal combustion engine of a vehicle to regulate the exhaust gas stream.

TECHNICAL BACKGROUND

A regulating flap configured as an exhaust flap is known from DE 10 2014 017 523 A1. A plate-shaped or shell-shaped fixing part is carried on the outer circumference of a flap body, which has a tubular configuration. A drive housing of a pivot drive may be fixed by screw connection to the fixing part for the flap diaphragm. An opening, through which a drive element of the pivot drive can be brought into drive connection with a pivot shaft that is carried pivotably about a pivot axis in the flap body, is formed in the fixing part.

SUMMARY

The object of the present invention is to provide a regulating flap, especially an exhaust flap for an exhaust system of an internal combustion engine, with a simplified configuration of a fixing device, which is provided for fixing a pivot drive in relation to a flap body.

This object is accomplished according to the present invention by a regulating flap, especially by an exhaust flap for the exhaust gas stream of an internal combustion engine, comprising a flap body, a flap diaphragm carried on a pivot shaft that is rotatable about a pivot axis in the interior of the flap body, and a pivot drive with a drive element to be coupled with the pivot shaft, further comprising a fixing device for fixing the pivot drive in relation to the flap body, the fixing device comprising a quarter-turn fastener (which may also be referred to as a bayonet coupling or bayonet fastener).

Since a bayonet fastener is used for fixing the pivot drive in relation to the flap body in case of the configuration according to the present invention, the fixing process may also be carried out in a simple manner, for example, in an automated manner, on the one hand. On the other hand, only a little space is required for installation for the fixed connection of the pivot drive to the flap body.

The bayonet fastener may comprise a first bayonet formation at a drive housing of the pivot drive and a second bayonet formation at a fixing formation provided at the flap body, which second bayonet formation can be meshed in a fixed manner with the first bayonet formation by relative rotary motion about a fixing rotation axis from a fixing preparation position, wherein to obtain an especially axially fixed bond, provisions may be made for at least one bayonet formation from the first bayonet formation and the second bayonet formation to have a plurality of fixing meshing recesses, which follow one another about the fixing rotation axis in a circumferential direction and which are open in the circumferential direction in relation to the fixing rotation axis, and for the other bayonet formation of the first bayonet formation and the second bayonet formation to comprise a fixing meshing projection which can be positioned in a manner meshing with a fixing meshing recess due to relative rotary motion in the circumferential direction, in association with at least one fixing meshing recess, preferably in association with each fixing meshing recess.

A configuration, which is structurally simple to embody, may provide for the fixing formation to comprise a fixing part, which is carried on the flap tube and is, for example, plate-shaped, and for a fixing opening to be provided at the fixing part, wherein the fixing meshing projection of the second bayonet formation protrudes into the fixing opening in the radially inward direction. In this case, the first bayonet formation may be provided at a fixing attachment of the drive housing, which fixing attachment can be inserted into the fixing opening, to establish the fixing meshing.

Provisions may be made for the drive element to pass through the fixing attachment, for a coupling of the pivot shaft with the drive element, which shaft coupling is simple to establish.

The first bayonet formation and the second bayonet formation may be arranged enclosing the fixing rotation axis in a ring-shaped manner. In order to be able to couple the drive element to the pivot shaft in the course of a mounting motion to be carried out in a simple manner, on the one hand, and in order to be able to mesh the two bayonet formations with one another, on the other hand, it is further proposed that the fixing rotation axis correspond to the pivot axis.

A detachment of the two bayonet formations meshing with one another in a fixed manner can be prevented, for example, by a blocking formation being provided for blocking the two bayonet formations against rotary motion in relation to one another when a fixing meshing has been established. Such a blocking formation may comprise, for example, a blocking bolt, preferably a screw bolt, which blocks the drive housing against rotary motion about the fixing rotation axis in relation to the fixing formation.

A mounting process, which is simple to carry out, can be further supported by the pivot shaft being coupled to the drive element by relative axial motion in the direction of the pivot axis for the joint rotation about the pivot axis. In particular, provisions may be made for the pivot shaft to be coupled with the drive element for joint rotation about the pivot axis when the bayonet formations are positioned in relation to one another in a fixing preparation position. Thus, first the rotary coupling between these two assembly units, which are aligned or will be aligned with one another to establish the rotary coupling by means of a positive locking, can be generated by moving the pivot shaft in relation to the drive element in the axial direction, whereupon the fixing meshing of the two bayonet formations can be established by the relative rotation of the drive housing in relation to the flap body.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying

DESCRIPTION OF PREFERRED EMBODIMENTS

Figure 1:
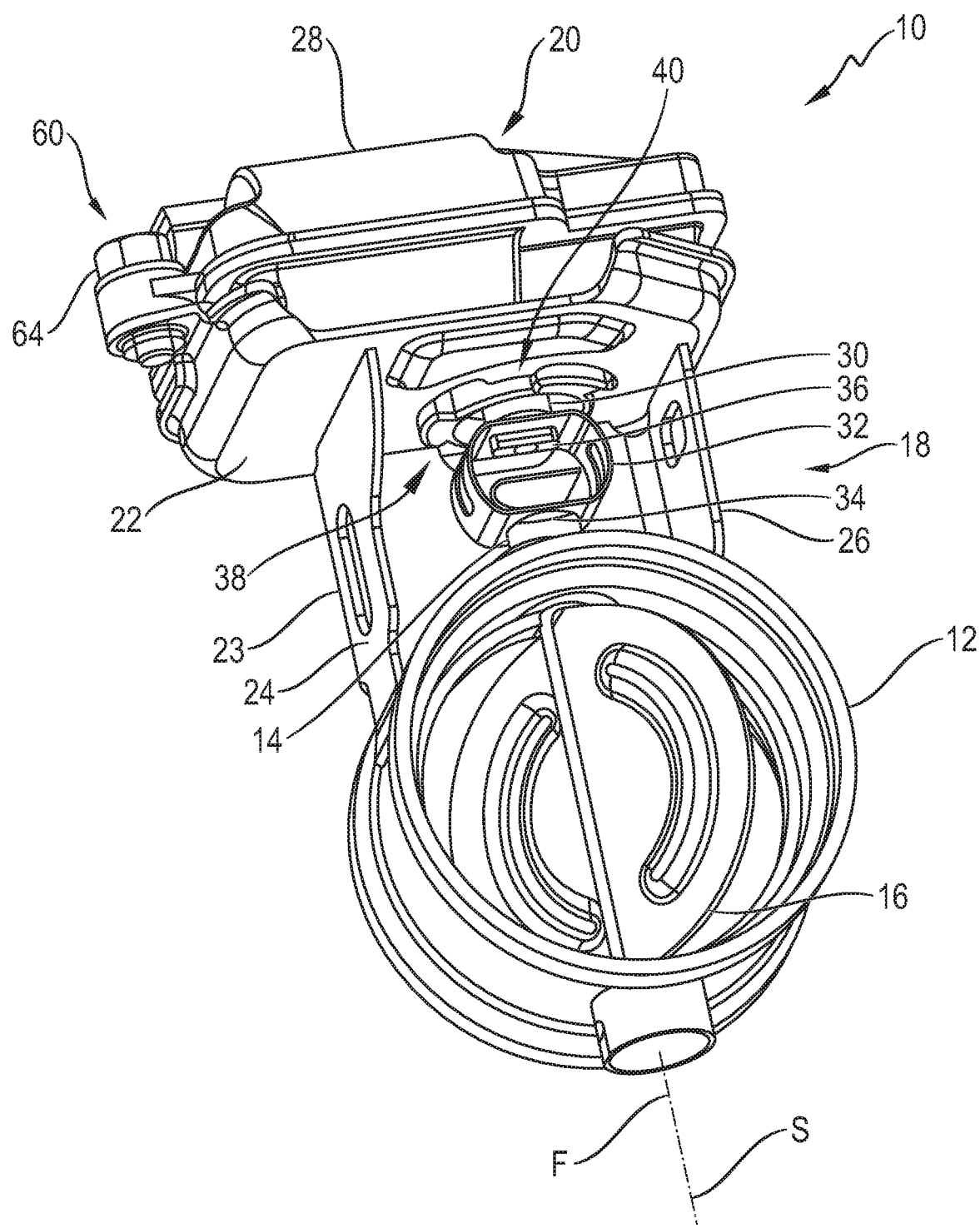
FIG. 1 is a perspective view of a regulating flap.
Figure 2:
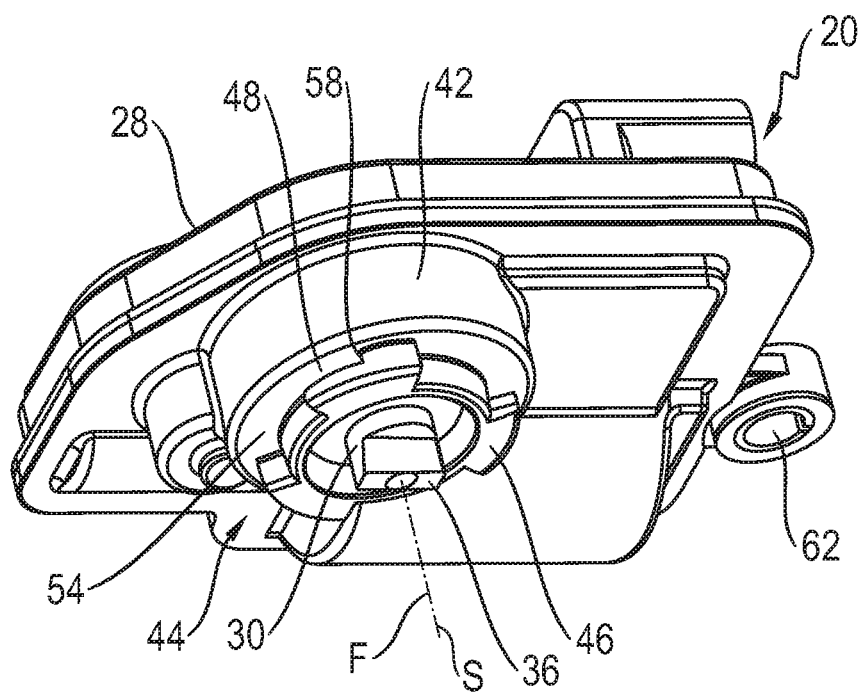
FIG. 2 is a perspective view of a pivot drive of the regulating flap from FIG. 1.
Figure 3:
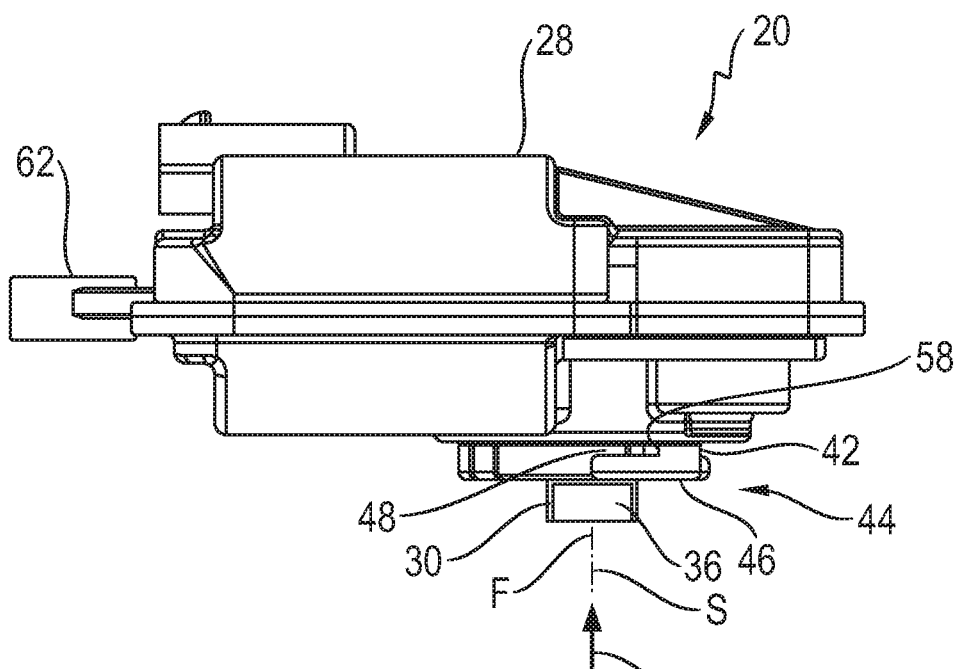
FIG. 3 is a lateral view of the pivot drive.
Figure 4:
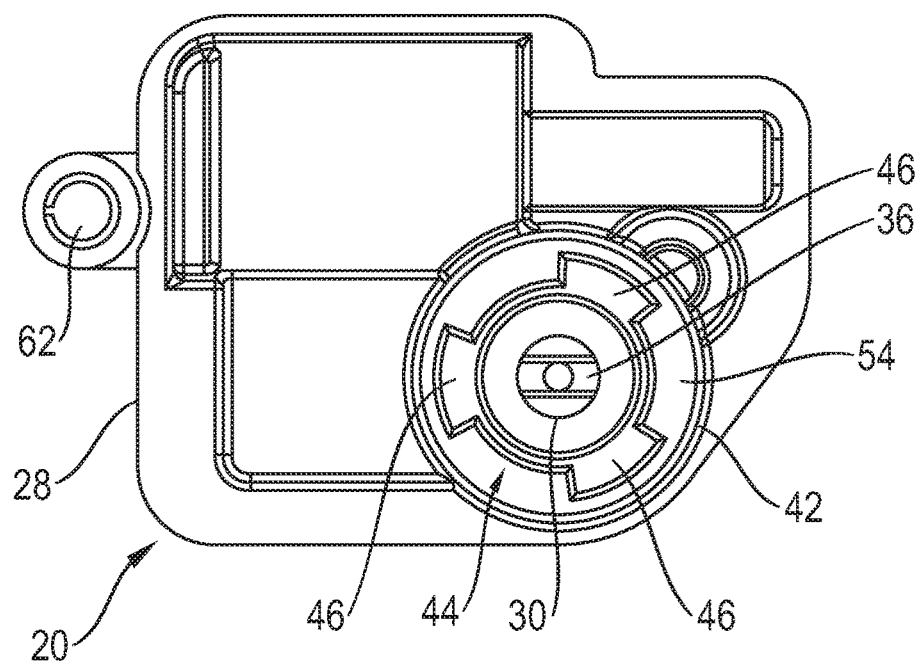
FIG. 4 is a view of the pivot drive from FIGS. 2 and 3 in viewing direction IV in FIG. 3.
Figure 5:
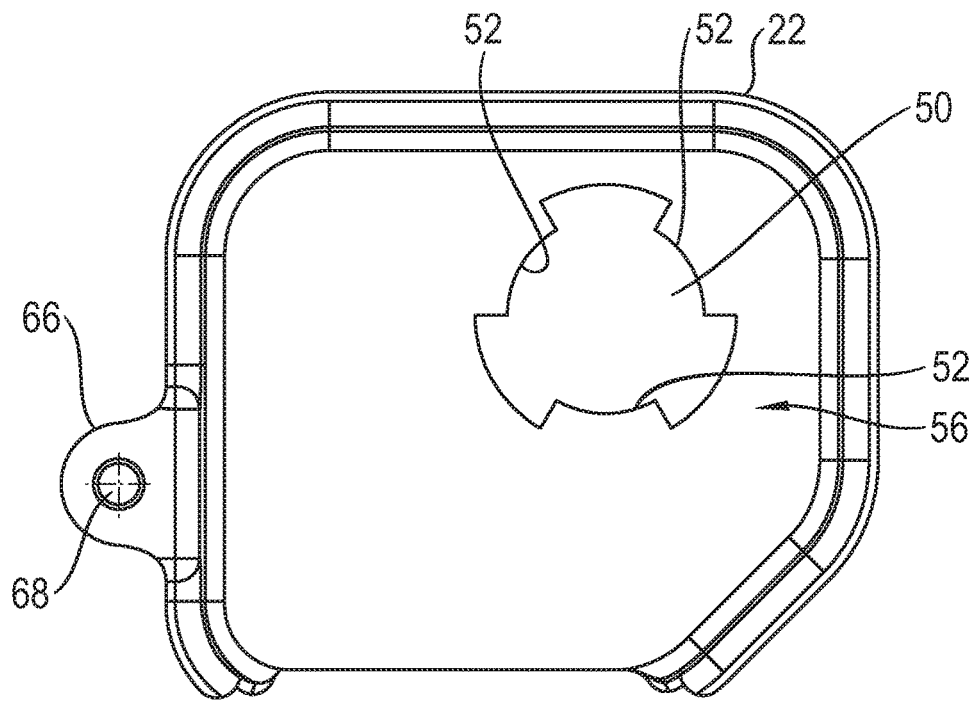
FIG. 5 is a top view of a fixing part of a fixing formation for fixing the pivot drive to a flap body of the regulating flap from FIG. 1.
Figure 6:
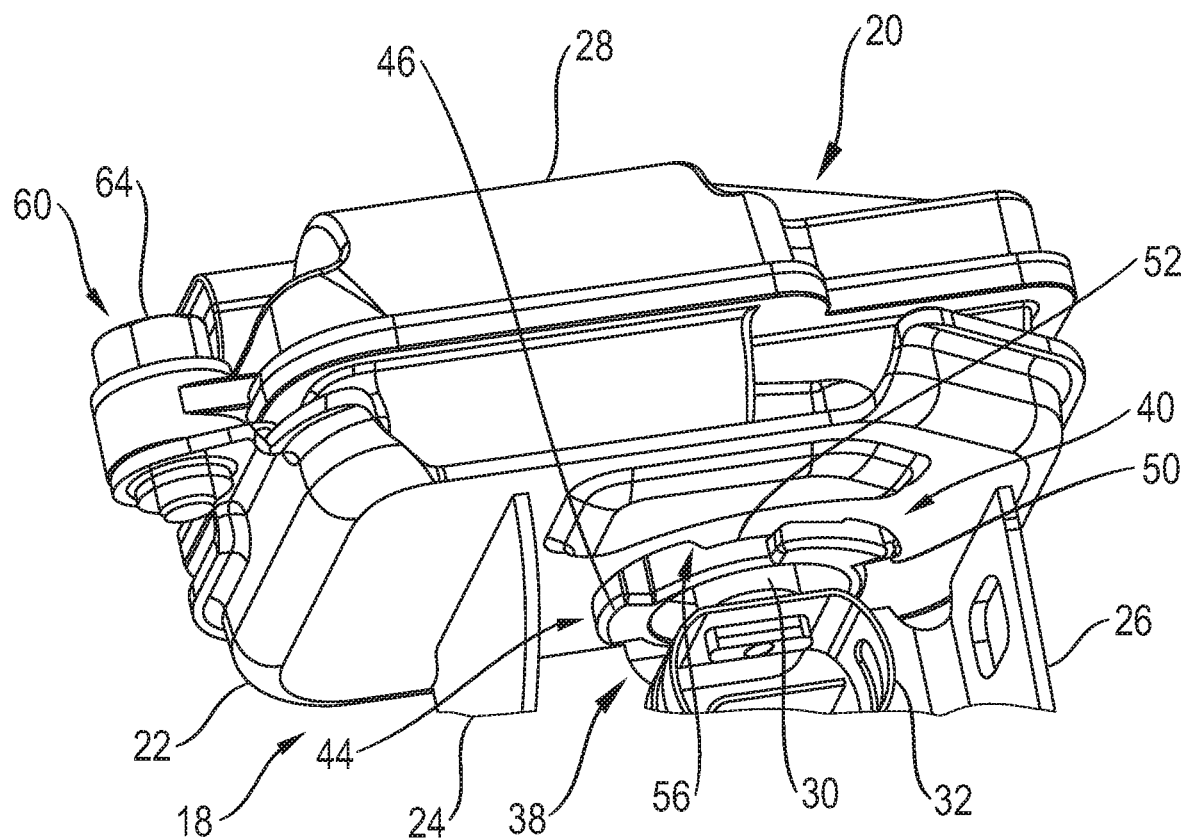
FIG. 6 is an enlarged view of the area of the connection of the pivot drive to the fixing formation.

Referring to the drawings, FIG. 1 shows a regulating flap 10 that can be used, for example, as an exhaust flap in an exhaust system of an internal combustion engine of a vehicle. The regulating flap 10 comprises a tubular flap body 12, in which a flap diaphragm 16, which is carried on a pivot shaft 14, is carried pivotably about a pivot axis S.

A fixing formation generally designated by 18, via which a pivot drive 20 can be fixed to the flap body 12, is provided on the outer side of the tubular flap body 12. The fixing formation 18 comprises a plate-shaped or shell-shaped fixing part 22, which accommodates the pivot drive 20 in the manner described below and which is connected to two legs 24, 26 at the flap body 12 via a U-shaped carrier 23. The pivot shaft 14 is coupled with a drive element 30 of the pivot drive 20, which protrudes from the drive housing 28 of the pivot drive 20, for joint rotation in a spatial area enclosed by the carrier 23 and the fixing part 22. A coupling element 32, which is bent into a ring-shaped formation and has a leaf-spring-like configuration, with which a coupling end area 34 of the pivot shaft 14 as well as a coupling end area 36 of the drive element 30 mesh in a positive-locking manner, can be used for this purpose. It should be pointed out here that it is also possible to use other structural configurations to establish the rotary coupling between the drive element 30 and the pivot axis 14.

The pivot drive 20 is connected to the fixing formation 18 and thus to the flap body 12 by a fixing device 40 that is configured with a bayonet fastener 38. The bayonet fastener 38 comprises a first bayonet formation 44 at a fixing attachment 42 protruding from the drive housing 28 of the pivot drive 20. The first bayonet formation 44 comprises, in turn, three bayonet projections 46, which are arranged at equal angular distance to one another in the example shown, at the fixing attachment 42, wherein each bayonet projection 46 forms a fixing meshing recess 48, which is open in a circumferential direction and in the radially outward direction, but is closed in the other circumferential direction. It should be pointed out here that circumferential direction is in reference to the pivot axis S, which also corresponds to the rotation axis of the drive element 30, which pivot axis S, as will be described below, also forms a fixing rotation axis F.

A fixing opening 50 is formed in the plate-shaped or shell-shaped fixing part 22. Three fixing meshing projections 52 are formed at the fixing part 22 at equal circumferential distance to one another. The circumferential extension of these fixing meshing projections 52 is selected such that each fixing meshing projection 52 may enter the fixing opening 50 in an intermediate space formed between two bayonet projections 46, which follow one another in the circumferential direction, when the fixing attachment 42 with its first bayonet formation 44 formed thereon is moved for insertion. The pivot drive 20 with its fixing attachment 42 is inserted so far into the fixing opening 50 until a bottom area 54 formed at the fixing attachment 42 abuts the fixing part 22. In the fixing preparation position thus obtained, each fixing meshing projection 52 is axially aligned with one of the fixing meshing recesses 48. By rotating the pivot drive 20 in relation to the fixing part 22 and a relative rotation of the first bayonet formation 44, which comprises the bayonet projections 46, in relation to a second bayonet formation 56, which comprises one of the fixing meshing projections 52, it can then be ensured that the fixing meshing projections 52 are moved into the fixing meshing recesses 48 until they come into contact with the bottom areas 58 of the bayonet projections 46, which bottom areas 58 define the fixing meshing recesses in the circumferential direction and thus a further rotation of the pivot drive 20 in relation to the fixing part 22 is no longer possible.

A blocking formation generally designated by 60 is provided to ensure that the fixing meshing established in this manner is maintained and a rotation of the pivot drive 20 in relation to the fixing formation 18 cannot occur. The blocking formation 60 comprises a passage opening 62, which is configured as being eccentric to the fixing rotation axis F or to the fixing attachment 42, at the drive housing 28 of the pivot drive 20, for a blocking element 64, which is configured, for example, as a screw bolt A meshing opening 68, which may be configured, for example, as an internally threaded opening, is provided at the fixing part 22 in association with the passage opening 62 at a laterally protruding bracket 66. When the fixing meshing is established, the passage opening 62 is above the meshing opening 68, so that the blocking element 64 can be inserted, especially screwed into the meshing opening 68 through the passage opening 62.

A stable positioning of the pivot drive at the fixing formation 18 and thus at the flap body 12, which positioning is secured against detachment, is thus guaranteed by the positive locking established by means of the fixing device 40 or the two bayonet formations 44, 56 and the securing against rotation generated by the blocking device 60. Since the drive element 30 passes through the axial attachment 52 and protrudes axially above same, the rotary coupling of the drive element 30 with the pivot shaft 14 can also be established when the pivot drive 20 moves into the fixing preparation position, i.e., when the fixing attachment 42 with its first bayonet formation 44 is inserted into the fixing opening 50, so that the coupling between the drive element 30 and the pivot shaft 14 is already established when the pivot drive 20 is positioned in the fixing preparation position. The components to be coupled with one another in a positive-locking manner are moved axially towards one another to establish this rotary coupling, for which purpose it may, furthermore, be necessary to rotate at least one of these components to align the formations to be coupled with one another in a positive-locking manner with one another. As an alternative, especially when a flexible, elastically deformable coupling element 32 is used, this coupling element 32 may also only be used if the fixing meshing is established and, for example, the pivot drive 20 is secured by the blocking formation 60 against rotation in relation to the fixing formation 18, and the coupling element 32 may be used to couple the pivot drive 20 with the pivot shaft 14 and thus also with the flap diaphragm 16 by means of establishing a positive locking in relation to the pivot shaft 14, on the one hand, and in relation to the drive element 30, on the other hand.

The configuration of the fixing device according to the present invention saves space available for installation and makes possible a good access for further work, especially in order to fix the tubular flap body to other assembly units, for example, to an exhaust system of an internal combustion engine.

Finally, it should be pointed out that the configuration of a regulating flap according to the present invention may also be used in case of regulating flaps, which are used in other fields of application, for example, in case of acoustic flaps or low-pressure exhaust gas return flaps.

While specific embodiments of the invention have been shown and described in detail to illustrate the application of the principles of the invention, it will be understood that the invention may be embodied otherwise without departing from such principles.

The invention claimed is:

1. A regulating flap comprising:
    a flap body;
    a pivot shaft;
    a flap diaphragm carried on the pivot shaft, the pivot shaft being rotatable about a pivot axis in an interior of the flap body;
    a pivot drive with a drive element coupled with the pivot shaft; and
    a fixing device fixing the pivot drive in relation to the flap body, the fixing device comprising a bayonet fastener, the bayonet fastener comprising a first bayonet formation at a drive housing of the pivot drive, the bayonet fastener further comprising a second bayonet formation at a fixing formation provided at the flap body, which second bayonet formation is meshed in a fixed manner with the first bayonet formation due to a relative rotary motion of the first bayonet formation relative to the second bayonet formation about a fixing rotation axis from a fixing preparation position, the first bayonet formation having a plurality of fixing meshing recesses that follow one another about the fixing rotation axis in a circumferential direction and are open in the circumferential direction in relation to the fixing rotation axis, the second bayonet formation comprising a fixing meshing projection in association with at least one of the fixing meshing recesses of the plurality of fixing meshing recesses, each fixing meshing projection being positioned in a manner meshing with one of the fixing meshing recesses of the plurality of fixing meshing recesses in the circumferential direction due to the relative rotary motion of the first bayonet formation relative to the second bayonet formation, the fixing formation comprising a fixing part carried on the flap body, wherein a fixing opening is provided at the fixing part, wherein each fixing meshing projection of the second bayonet formation is provided at the fixing part and protrudes into the fixing opening in the radially inward direction, the first bayonet formation being provided at a fixing attachment of the drive housing, the fixing attachment being inserted into the fixing opening, the drive element passing through the fixing attachment.

2. The regulating flap in accordance with claim 1, wherein:
    the first bayonet formation and the second bayonet formation are arranged enclosing the fixing rotation axis; or
    the fixing rotation axis corresponds to the pivot axis; or
    the first bayonet formation and the second bayonet formation are arranged enclosing the fixing rotation axis and the fixing rotation axis corresponds to the pivot axis.

3. The regulating flap in accordance with claim 1, further comprising:
    a blocking formation for blocking the first bayonet formation and the second bayonet formation against rotary motion in relation to one another with each fixing meshing projection being positioned in the manner meshing with one of the fixing meshing recesses.

4. The regulating flap in accordance with claim 3, wherein the blocking formation comprises a blocking bolt, which blocks the drive housing against rotary motion about the fixing rotation axis in relation to the fixing formation.

5. The regulating flap in accordance with claim 1, wherein the pivot shaft is coupled with the drive element for joint rotation about the pivot axis due to a relative axial motion in the direction of the pivot axis.

\* \* \* \* \*